Oct. 16, 1934. J. SOSS Re. 19,345

HINGE

Original Filed March 7, 1929

INVENTOR
Joseph Soss
BY
Howard C. Thompson
ATTORNEY

Reissued Oct. 16, 1934

Re. 19,345

UNITED STATES PATENT OFFICE 19,345

HINGE

Joseph Soss, Roselle, N. J.

Original No. 1,824,451, dated September 22, 1931, Serial No. 345,048, March 7, 1929. Application for reissue August 20, 1932, Serial No. 629,736

19 Claims. (Cl. 16—163)

This invention relates to hinges and particularly to devices of this class adapted for use in connection with the hoods of motor vehicles; and the object of the invention is to provide a hinge involving a stationary hinge butt or member and two movable members hingedly coupled with the stationary member and arranged at opposite sides thereof and in connection with which the separate parts of the hood are secured, the stationary hinge supporting member forming a finishing strip arranged between adjacent side edges of the separate parts of the hood to form a neat and finished appearance; a further object being to provide a hinge of the class specified wherein the movable hinge members are coupled with the stationary hinge member by longitudinal sliding movement, all of said hinge members being composed of sheet metal and extending the full length of the hood or other supports in connection with which they are mounted; a still further object being to provide a hinge of the class specified, wherein the movable members are coupled to a stationary member through pintle pins; and with these and other objects in view, the invention consists in a device of the class and for the purpose specified, which is simple in construction, efficient in use and which is constructed as hereinafter described and claimed.

The invention is fully disclosed in the following specification of which the accompanying drawing forms a part, in which the separate parts of my improvement are designated by suitable reference characters in each of the views, and in which:—

Figure 1:
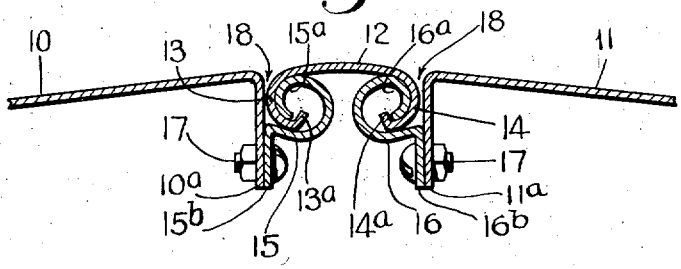
Fig. 1 is a transverse, sectional view of one form of hinge which I employ.

In the several figures of the drawing, it will be noted that one part of the hinge constitutes a coupling and spacing member which is disposed between the separate hood parts 10 and 11 of the hood of a motor vehicle. In Fig. 1 of the drawing, I have shown at 12, a stationary hinge butt or member which is substantially channel-shaped in cross sectional form, the channel being directed downwardly, and the top wall is preferably curved or arc-shaped in cross sectional form to correspond with the curvature of the hood parts 10 and 11. However, this is not absolutely necessary, as said wall may be flat if desired.

The member 12 is in the form of an elongated body running the full length of the hood parts 10 and 11, and the side portions thereof are curved downwardly to form arc-shaped bearing members 13 and 14, each terminating in an upwardly extending hook-shaped flange 13*a* and 14*a*.

At 15 and 16, I have shown two similarly formed movable hinge members which also are in the form of elongated strips fashioned to form at one side edge, curved bearing portions 15*a*—16*a* which cooperate with the bearing portions 13 and 14 to control and limit the swinging movement of the hinge members 15 and 16 with relation to the member 12. The bearings 15*a* and 16*a* extend in curved portions which pass beneath the bearings 13 and 14 and terminate in angularly disposed attaching plates 15*b* and 16*b* which are secured to attaching flanges 10*a* and 11*a* on the parts 10 and 11, the coupling being made by bolts, rivets or other methods of attachment at 17.

In the normal or closed position of the hood parts 10 and 11, it will be apparent that the flanges 10*a* and 11*a* are arranged adjacent the opposite side edges of the member 12 or the bearings 13 and 14 thereon so as to form a neat and finished appearance between said member and the separate hood parts. It will also be apparent that any rain or other water that may pass down through the crevices 18 will extend into the downwardly curved portions of the members 15 and 16 which will function as troughs to direct the water to either or both ends of the hood for discharge, thus preventing the moisture from coming in contact with the engine or its working parts. With this construction, it will also be apparent that either and/or both of the hood parts may be moved into raised position in acquiring access to the engine without one hood part interfering with the other part.

In coupling the members 15 and 16 with the member 12, it will be understood that the same must be engaged by endwise sliding movement, the bearing members 15*a* and 16*a* entering the channels formed by the bearing members 13 and 14 from either end of the member 12.

Figure 3:
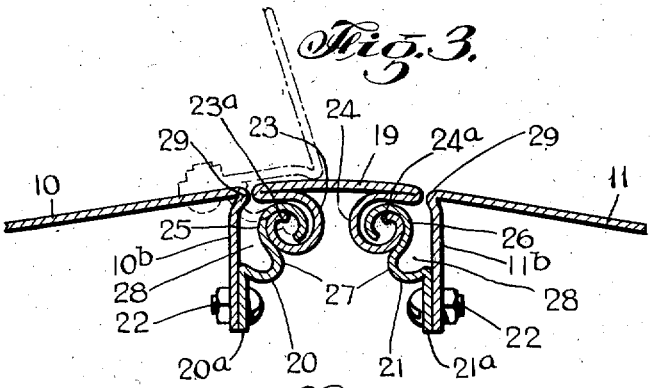
Fig. 3 is a view similar to Fig. 1 showing another modification.

In Fig. 3 of the drawing, I have shown a slight modification of the structure shown in Fig. 1. In this figure I have shown at 19 a stationary hinge member, and at 20 and 21 two movable hinge members, the latter having attaching flanges 20*a* and 21*a* attached to flanges 10*b* and 11*b* on the parts 10 and 11 by bolts, rivets or the like 22. With the construction shown in Fig. 3, I employ on the member 19, substantially circular bearings 23 and 24 which open outwardly and laterally instead of inwardly as in Fig. 1. These bearings terminate in hook-shaped flanges 23*a* and 24*a* similar to the flanges 13*a* and 14*a*.

The members 20 and 21 terminate in their free side edges in circular bearings 25 and 26 which cooperate with the bearings 23 and 24 in the swinging movement of the parts 10 and 11 to form the hinge joints. The central portions of the members 20 and 21 are offset inwardly as seen at 27, and these offsets form stop shoulders which engage the side edges of the upper part of the member 19 as clearly indicated in dotted lines in Fig. 3 of the drawing to limit the opening of the separate hood parts, the part 10 being shown in open position.

In this connection, it will also be noted that the bearings 25 and 26 of the members 20 and 21 are offset with respect to the flanges 10*b* and 11*b* to form recesses 28 into which the side edges of the member 19 pass in the operation of moving the hood parts 10 and 11 into raised or open position. The hood members where folded to form flanges are offset inwardly as seen at 29 to form a comparatively narrow recess or space between the adjacent parts forming a neat and finished appearance. The offset portions 27 of the members 20 and 21 also form troughs into which rain water is free to pass for discharge at the opposite ends of the hinge structure.

Figure 2:
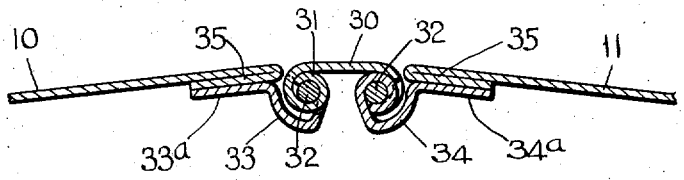
Fig. 2 is a view similar to Fig. 1 showing a modification.

In Fig. 2 of the drawing, I have shown another modification and in this figure, I have shown at 30 a stationary hinge member, the side edges of which terminate in downwardly projecting curved pintle bearings 31 in which pintle pins 32 are mounted. The movable hinge members 33 and 34 are provided at one side with curved pintle bearings arranged on the pins 32 intermediate the bearings 31, the hinge members 33 and 34 extending outwardly in curved and straight end portions 33*a* and 34*a* which are welded or otherwise attached to the separate hood parts 10 and 11 or to flanges 35 turned inwardly upon said hood parts. This construction is practically identical to the structure shown in Fig. 1, with the exception that instead of providing a loose or varying hinge axis, a definite pintle pin axis is provided between the members 30, 33, and 34.

Figure 4:
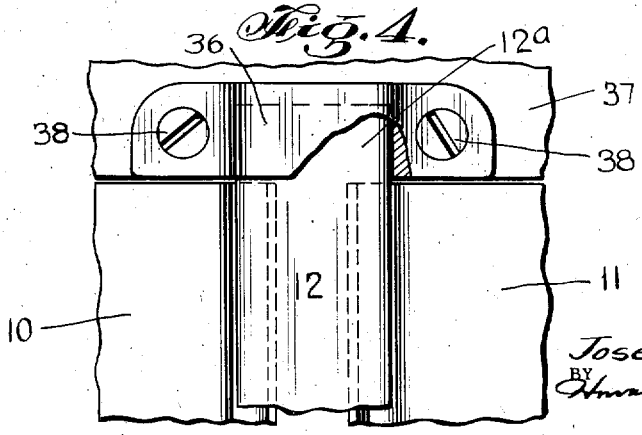
Fig. 4 is a plan view of one end portion of the hinge structure, with part of the construction broken away.

In Fig. 4 of the drawing, I have shown means for supporting one end of the stationary hinge member of the respective butts, it being understood that both ends of said member are fixedly supported, the ends of said member projecting beyond the other companion hinge members as well as the ends of the hood. In said figure I have shown for the purpose of illustrating one of these attachments, the stationary hinge member 12, the extension 12*a* of which is arranged within a yoke-shaped keeper 36 which is secured to a support 37 by screws or other devices 38 passed through flanges projecting from opposite sides of the member 36.

From the foregoing, it will be apparent that in all the forms of hinge structure shown, the stationary hinge member is exposed and arranged intermediate the adjacent side edges of the hood parts, and will thus present a neat and finished bead or rib extending longitudinally of the central portion of the hood, and it will be understood that while I have shown certain details of construction for carrying my invention into effect, that I am not necessarily limited to these details nor to the specific use of the hinge structure herein referred to, the same being applicable for use in connection with coupling and supporting body parts or members of any kind or class and on any type of apparatus, and various other changes in and modifications of the construction herein shown and described may be made within the scope of the appended claims without departing from the spirit of my invention or sacrificing its advantages.

It will be understood that while the members 15*a* and 16*a* are shown in widely spaced relation, that adjacent surfaces of these members may be closely arranged or in fact in substantially abutting relation. This is also true of the bearings 31 on the strip 30 and the members 23 and 24 on the strip 19. The members are shown separated in the drawing for the purpose of clarifying the illustration.

Having fully described my invention, what I claim as new and desire to secure by Letters Patent, is:—

1. A hinge for coupling independent and relatively movable body parts comprising three hinge members in the form of elongated and comparatively narrow strips, one strip being longer than the others to provide supporting portions for the hinge, the central portion of said long strip or hinge member being slightly arched, and the side edges of said hinge member projecting downwardly and inwardly with respect to the concave face of the strip to form oppositely disposed and substantially cylindrical bearings, the other hinge members being of substantially similar cross sectional dimensions and having at one side thereof substantially cylindrical bearings adapted to be arranged and operated in the cylindrical bearings of the first named hinge member, and the other side of the second named hinge members forming attaching plates with which the independent body parts are coupled.

2. A hinge for pivotally coupling two independent body parts to permit independent and relative movement of said parts comprising a hinge arranged intermediate adjacent edges of said parts and forming a finishing strip disposed therebetween the outer surface of the finishing strip being in substantial alinement with the outer surface of the body parts, said hinge comprising a stationary hinge member and two other hinge members adapted to be coupled with said body parts, and the second named hinge members having hinge connection with the first named hinge member to permit swinging movement of said body parts relatively to the stationary hinge member, and the stationary and second named hinge members consisting of elongated narrow strips of substantially the same transverse dimensions, the stationary hinge member being longer than the others to provide mounting ends therefor.

3. A hinge for pivotally coupling independent and relatively movable body parts comprising three hinge members in the form of elongated and comparatively narrow strips, the side edges of one of said hinge members projecting downwardly and inwardly with respect to the under face of the body portion thereof to form oppositely disposed curved bearing members, the other hinge members being of substantially similar cross sectional dimensions and having at one side thereof substantially curved bearings adapted to be arranged and operated in the curved bearings of the first named hinge member, the other side of the second named hinge members forming attaching plates with which the independent body parts are coupled, mounting extensions on one of the hinge members, and hinge supporting means for receiving said mounting extensions.

4. A motor vehicle hood hinge forming pivotal mountings for adjacent edge portions of the separate hood parts, said adjacent edges of the hood parts being arranged in spaced relation, said hinge being arranged in the space intermediate said hood parts, and comprising a stationary hinge member of a width substantially equal to the distance between said edges, two other hinge members coupled with said hood parts and having hinge connections with the side edges of the first named hinge member, and the second named hinge members including upwardly extending channels arranged below the stationary hinged member and into which water passing between the hinge and the hood parts is adapted to pass.

5. A hinge for motor vehicle hoods having independent hood parts the adjacent edges of which are in spaced relation and including angularly arranged flanges, said hinge consisting of a stationary hinge member and two movable hinge members having hinge connections with the side edges of the stationary hinge member, said movable hinge members including angularly disposed attaching plates in substantial alinement with the side edges of the stationary hinge member and attached to the flanges of said hood parts, the side edges of the hood parts being disposed in juxtaposition to the longitudinal edges of the stationary hinge member, and the movable hinge members forming upwardly directed drainage channels arranged below the stationary hinge member and in communication with the intersection between the hood parts and stationary hinge member.

6. A hinge for motor vehicle hoods having independent hood parts the adjacent edges of which are in spaced relation and include angularly arranged flanges, said hinge consisting of a stationary hinge member and two movable hinge members having hinge connections with the side edges of the stationary hinge member, said movable hinge members including angularly disposed attaching plates in substantial alinement with the side edges of the stationary hinge member and attached to the flanges of said hood parts, the side edges of the hood parts being disposed in juxtaposition to the longitudinal edges of the stationary hinge member, and one of the hinge members including extending portions at the ends thereof forming means for mounting the hinge in connection with suitable supports.

7. A hinge comprising a pair of hinge parts, each having a bead formed therein for interfitting pivotal engagement one of said hinge parts projecting beyond the other, and a bracket member mounted on a fixed support and in which said projection is supported.

8. A hood hinge comprising a pair of hinge parts each having a bead formed therein in one edge for interfitting pivotal engagement, one of said hinge parts projecting beyond the other to form a supporting end, and a bracket member mounted on a fixed support in which said supporting end is mounted.

9. In a hood hinge, an outer hinge part having a bead formed in one edge thereof, an inner hinge part having a bead formed in one edge thereof for interfitting pivotal engagement with the bead of the outer hinge part, fixed brackets located adjacent the ends of the hinge, one of said parts projecting at each end to form supporting portions arranged in said brackets.

10. A hinge for coupling independent and relatively movable body parts comprising a pair of hinge members, each having a bead formed in one edge for interfitting pivotal engagement, the opposite edge being connected to one of the body parts, a fixed bracket provided with a recess and an extension on the end of one of said hinge parts received in said bracket recess.

11. A hinge for connecting a pair of hood sections having laterally extending flanges at their adjacent edges, comprising inner and outer hinge parts in the form of elongated strips having beads formed in certain edges thereof for interfitting pivotal engagement, the opposed edges of two hinge parts being secured to the flanges of said hood sections to position the adjacent edges of the hood sections contiguous with the outer bead, and brackets in which the ends of said hinge are supported.

12. A hinge comprising three hinge parts, each having a bead formed therein for interfitting pivotal engagement with the beaded edge of an adjacent hinge part, one of said hinge parts projecting beyond the others, and a bracket member mounted on a fixed support and in which said projection is supported.

13. In a hood hinge, an outer hinge part having beaded side edges and inner hinge parts having a bead formed in one edge thereof for interfitting pivotal engagement with one of the beads of the outer hinge part, fixed brackets located adjacent the ends of the hinge, and one of said hinge parts extending at each end of the hinge to form a bearing portion arranged in said brackets.

14. A hood construction comprising a pair of wings having complementary rolled edge portions for hinging them together, and means for mounting opposed ends of the wings on spaced parts of a vehicle, said means comprising projecting end portions on one of the wings.

15. A hood construction comprising a pair of wings having complementary rolled edge portions for hinging them together, and means for mounting opposed ends of the wings on spaced parts of a vehicle, comprising projecting end portions on one of the wings, said rolled edges constituting the sole hinging connection between the wings.

16. In combination, a pair of sheet elements having rolled edges directly coacting with each other to form a hinge for hingedly supporting one element on the other, and means at opposite ends of the elements for supporting the elements on spaced stationary supports, said means comprising projecting ends of one of the elements at opposite ends of the hinge.

17. In combination, a pair of sheet elements having rolled edges directly coacting to provide a hinge connecting them, and means at one end of the hinge for supporting the elements on a stationary support, said means comprising a projecting end on one of the hinge elements to be supported in a member on the support.

18. In combination, a pair of sheet elements having rolled edges directly coacting to provide a hinge connecting the elements, one of said elements projecting beyond the end of the hinge for supporting it and the elements on a stationary support, and means for limiting hinging action of either element in one direction.

19. In combination, a pair of spaced supports, a pair of hinge parts having turned interfitting edge parts directly coacting for hingedly connecting them, each end of the assembled hinge parts having one of the hinge parts projecting beyond the end of the other part, and means for mounting said projecting ends on the supports.

JOSEPH SOSS.